(12) United States Patent
Matsubara et al.

(10) Patent No.: US 11,260,847 B2
(45) Date of Patent: Mar. 1, 2022

(54) HYBRID VEHICLE

(71) Applicant: TOYOTA JIDOSHA KABUSHIKI KAISHA, Toyota (JP)

(72) Inventors: Keigo Matsubara, Nagoya (JP); Ayumu Sagawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 296 days.

(21) Appl. No.: 16/666,537

(22) Filed: Oct. 29, 2019

(65) Prior Publication Data

US 2020/0189560 A1 Jun. 18, 2020

(30) Foreign Application Priority Data

Dec. 12, 2018 (JP) .............................. JP2018-232239

(51) Int. Cl.
*B60W 20/10* (2016.01)
*F16D 48/02* (2006.01)
(Continued)

(52) U.S. Cl.
CPC .............. *B60W 20/10* (2013.01); *B60K 6/387* (2013.01); *B60K 6/48* (2013.01); *B60W 10/02* (2013.01); *B60W 10/023* (2013.01); *B60W 10/06* (2013.01); *B60W 10/08* (2013.01); *F16D 25/14* (2013.01); *F16D 48/066* (2013.01); *B60W 2510/0291* (2013.01);
(Continued)

(58) Field of Classification Search
CPC .... B60W 20/10; B60W 10/02; B60W 10/023; B60W 10/06; B60W 10/08; B60W 2510/0291; B60W 2710/022; B60W 2710/0666; B60W 2710/083; B60K 6/387; B60K 6/48; F16D 25/14; F16D 48/066; F16D 2500/1026; F16D 2500/10412; F16D 2500/1066
See application file for complete search history.

(56) References Cited

U.S. PATENT DOCUMENTS 5,562,125 A * 10/1996 Bray ...................... B60T 13/686
137/625.64
9,382,953 B2 * 7/2016 Kuwahara ............... F16D 25/14
(Continued)

FOREIGN PATENT DOCUMENTS

JP 2011-213310 A 10/2011

*Primary Examiner* — Richard W Ridley
*Assistant Examiner* — Aimee Tran Nguyen
(74) *Attorney, Agent, or Firm* — Oblon, McClelland, Maier & Neustadt, L.L.P.

(57) ABSTRACT

A vehicle control unit performs filling control in which the vehicle control unit boosts an oil pressure in a second oil passage by supplying electric power to a pressure regulating valve with a switch valve being in a first state in which the switch valve connects a first oil passage to a clutch and disconnects the second oil passage from the clutch, torque replacement control in which the vehicle control unit increases motor torque while reducing shaft torque of an engine, and clutch disengagement control in which the vehicle control unit disengages the clutch while performing hydraulic control by the pressure regulating valve with the switch valve being in the second state in which the switch valve connects the second oil passage to the clutch and disconnects the first oil passage from the clutch.

6 Claims, 7 Drawing Sheets

(51) Int. Cl.
  *F16D 48/06*  (2006.01)
  *B60K 6/48*  (2007.10)
  *B60W 10/02*  (2006.01)
  *B60W 10/06*  (2006.01)
  *B60W 10/08*  (2006.01)
  *B60K 6/387*  (2007.10)

(52) U.S. Cl.
  CPC ......... *B60W 2710/022* (2013.01); *B60W 2710/0666* (2013.01); *B60W 2710/083* (2013.01); *F16D 2500/1026* (2013.01); *F16D 2500/1066* (2013.01); *F16D 2500/10412* (2013.01)

(56) References Cited

U.S. PATENT DOCUMENTS

| | | | |
|---|---|---|---|
| 2008/0071437 A1* | 3/2008 | Hirata | B60W 20/40 701/22 |
| 2010/0075798 A1* | 3/2010 | Suzuki | B60W 20/40 477/5 |
| 2015/0032358 A1* | 1/2015 | Amemiya | B60L 15/2054 701/104 |

\* cited by examiner

HYBRID VEHICLE

INCORPORATION BY REFERENCE

The disclosure of Japanese Patent Application No. 2018-232239 filed on Dec. 12, 2018 including the specification, drawings and abstract is incorporated herein by reference in its entirety.

BACKGROUND

1. Technical Field

The disclosure relates to hybrid vehicles in which a clutch is interposed between an engine and a motor.

2. Description of Related Art

Japanese Unexamined Patent Application Publication No. 2011-213310 (JP 2011-213310 A) describes a hybrid vehicle including a motor disposed in a power transmission path between an engine and wheels and a clutch disposed in a part of the power transmission path which is located between the engine and the motor. In the hybrid vehicle described in JP 2011-213310 A, the drive mode is switched between an EV drive mode and an engine drive mode. In the EV drive mode, the vehicle runs by transmitting power of the motor to the wheels with the clutch being disengaged and the engine being stopped. In the engine drive mode, the vehicle runs by transmitting power of the engine to the wheels with the clutch being engaged.

SUMMARY

If the clutch is abruptly disengaged while the vehicle is running in the engine drive mode, the engine revs up or torque shock occurs, which degrades drivability. It is therefore desirable to gently disengage the clutch while gradually reducing the engaging force of the clutch when switching the drive mode from the engine drive mode to the EV drive mode. However, the clutch needs to be disengaged in a short time in order to quickly switch the drive mode from the engine drive mode to the EV drive mode.

When disengaging the clutch, the engaging force can be gradually reduced as described above by using, as a control valve for a clutch oil pressure, a pressure regulating valve that can regulate an oil pressure such as a linear solenoid valve rather than an on-off switch valve that switches between two states, namely the state in which the on-off switch valve supplies an oil pressure and the state in which the on-off switch valve stops supplying the oil pressure. However, a larger amount of electric power is required to operate the pressure regulating valve than to operate the on-off switch valve. Power consumption is therefore increased if the clutch oil pressure is controlled only by the pressure regulating valve.

A hybrid vehicle according to one aspect of the disclosure includes: an engine mounted on a vehicle; a motor disposed in a power transmission path from the engine to a wheel; a clutch disposed in a part of the power transmission path, which is located between the engine and the motor; an oil pressure generating unit that generates a clutch engagement oil pressure; a pressure regulating valve that regulates the clutch engagement oil pressure in accordance with an amount of electric power supplied to the pressure regulating valve and outputs the resultant oil pressure and that stops outputting the oil pressure when supply of electric power to the pressure regulating valve is stopped; a first oil passage that supplies the clutch engagement oil pressure generated by the oil pressure generating unit to the clutch; a second oil passage that supplies the oil pressure output from the pressure regulating valve to the clutch; and a switch valve that switches between a first state and a second state. The first state is a state in which the switch valve connects the first oil passage to the clutch and disconnects the second oil passage from the clutch, and the second state is a state in which the switch valve connects the second oil passage to the clutch and disconnects the first oil passage from the clutch.

The hybrid vehicle further includes a vehicle control unit that selects one of a plurality of drive modes and performs drive control of the vehicle. The plurality of drive modes include an engine drive mode in which the vehicle runs by transmitting power of the engine to the wheel and an EV drive mode in which the vehicle runs with power of the motor with the engine being stopped. The vehicle control unit is configured to switch the drive mode to the EV drive mode when predetermined conditions for stopping the engine are satisfied during the engine drive mode. The vehicle control unit is also configured to stop supplying electric power to the pressure regulating valve and switch the switch valve to the second state and thus keep the clutch in a disengaged state during the EV drive mode, and to stop supplying electric power to the pressure regulating valve and switch the switch valve to the first state and thus keep the clutch in an engaged state during the engine drive mode. The vehicle control unit is also configured to perform filling control, torque replacement control, and clutch disengagement control. The filling control is control in which the vehicle control unit supplies electric power to the pressure regulating valve with the switch valve being in the first state and thus boosts an oil pressure in the second oil passage. The torque replacement control is control in which the vehicle control unit increases motor torque while reducing shaft torque of the engine. The clutch disengagement control is control in which the vehicle control unit disengages the clutch while performing hydraulic control by the pressure regulating valve with the switch valve being in the second state.

In such a hybrid vehicle, when supply of electric power to the pressure regulating valve is stopped and the switch valve is switched to the first state to connect the clutch to the first oil passage, the clutch engagement oil pressure is supplied to the clutch through the first oil passage. On the other hand, when supply of electric power to the pressure regulating valve is stopped and the switch valve is switched to the second state to connect the clutch to the second oil passage, supply of the oil pressure to the clutch is stopped. In this hybrid vehicle, the clutch is kept in the engaged state during the engine drive mode and is kept in the disengaged state during the EV drive mode, both with supply of electric power to the pressure regulating valve being stopped. When electric power is supplied to the pressure regulating valve with the switch valve being in the second state and thus with the second oil passage being connected to the clutch, the oil pressure regulated by the pressure regulating valve is supplied to the clutch. Accordingly, the oil pressure to be supplied to the clutch (hereinafter referred to as the clutch oil pressure) by the pressure regulating valve is controlled during transition between the drive modes, while supply of electric power to the pressure regulating valve that requires larger operating power than the switch valve is stopped during the engine drive mode and the EV drive mode, whereby power consumption can be restrained.

The smaller the engaging force of the clutch is, the smaller the torque that can be transmitted by the clutch is. Accordingly, if excessive shaft torque is input from the engine with the engaging force of the clutch being small, not all of the input shaft torque can be transmitted toward the wheel. On the other hand, if the torque replacement control in which the motor torque is increased while reducing the shaft torque of the engine is performed when switching the drive mode from the engine drive mode to the EV drive mode, the shaft torque of the engine can be reduced while maintaining driving torque required to move the vehicle. By reducing the shaft torque of the engine, the engaging force of the clutch can be reduced while maintaining transmission of the shaft torque to the wheel. Accordingly, the clutch can be smoothly disengaged by controlling the clutch oil pressure by the pressure regulating valve so as to reduce the engaging force with reduction in shaft torque of the engine by the torque replacement control.

In order to control the clutch oil pressure by the pressure regulating valve in the above hybrid vehicle, the switch valve need to be in the second state in which the second oil passage is connected to the clutch. However, during the engine drive mode, the clutch engagement oil pressure is supplied to the clutch through the first oil passage and supply of electric power to the pressure regulating valve is stopped. There is therefore no oil pressure in the second oil passage. Even if supply of electric power to the pressure regulating valve is started in this state, the oil pressure in the second oil passage does not increase immediately. Accordingly, if supply of electric power to the pressure regulating valve is started and the switch valve is switched to the second state to connect the second oil passage to the clutch in order to control the clutch oil pressure when the conditions for stopping the engine are satisfied and the drive mode is to be switched from the engine drive mode to the EV drive mode, the clutch oil pressure abruptly decreases immediately. As a result, the engaging force of the clutch decreases and the load of the engine decreases accordingly, which causes revving up of the engine. Moreover, since not all of the power of the engine can be transmitted to the wheel due to the decrease in engaging force, torque shock may occur.

Such an abrupt decrease in clutch oil pressure which occurs when the switch valve is switched to the second state can be suppressed by performing, before switching the switch valve to the second state, the filling control in which electric power is supplied to the pressure regulating valve with the switch valve being in the first state to boost an oil pressure in the second oil passage. However, if the torque replacement control is started after completion of the boosting of the oil pressure in the second oil passage by the filling control, disengagement of the clutch and thus stopping of the engine are delayed by the time required to complete the boosting.

In this respect, the vehicle control unit in the above hybrid vehicle is configured to switch the drive mode from the engine drive mode to the EV drive mode through first, second, and third stages. The first stage is a stage in which the vehicle control unit starts the filling control and the torque replacement control when the conditions for stopping the engine are satisfied. The second stage is a stage in which the vehicle control unit switches the switch valve to the second state during the torque replacement control to terminate the filling control and starts the clutch disengagement control. The third stage is a stage in which the vehicle control unit stops the engine after completion of the torque replacement control and the clutch disengagement control. That is, when switching the drive mode from the engine drive mode to the EV drive mode, the vehicle control unit first starts the filling control and the torque replacement control when the conditions for stopping the engine are satisfied. During the filling control, the first oil passage is connected to the clutch and the clutch oil pressure is supplied to the clutch. Transmission of the shaft torque of the engine can therefore be maintained during the filling control. The vehicle control unit switches the switch valve to the second state during the torque replacement control to terminate the filling control and starts the clutch disengagement control. Since the oil pressure in the second oil passage has been boosted by the filling control, the clutch oil pressure is restrained from decreasing at the time the switch valve is switched to the second state. The vehicle control unit stops the engine after completion of the torque replacement control and the clutch disengagement control, whereby the drive mode transitions to the EV drive mode. Accordingly, the filling control restrains a decrease in clutch oil pressure. Moreover, performing the filling control does not cause delay in completion of switching of the drive mode to the EV drive mode.

There is a case where the oil pressure in the second oil passage cannot be sufficiently boosted by the filling control within the period of the torque replacement control. In this case, if the filling control is terminated during the torque replacement control and the clutch disengagement control is started, the second oil passage is connected to the clutch with the oil pressure in the second oil passage not sufficiently boosted. This causes a decrease in clutch oil pressure. In this respect, the vehicle control unit in the above hybrid vehicle may be configured to perform a filling determination process when the conditions for stopping the engine are satisfied. The filling determination process is a process in which the vehicle control unit determines whether the boosting of the oil pressure in the second oil passage by the filling control can be completed within a period from start to completion of the torque replacement control. In this case, the vehicle control unit may be configured to switch the drive mode from the engine drive mode to the EV drive mode through fourth, fifth, and sixth stages when the vehicle control unit determines in the filling determination process that the boosting cannot be completed within this period. The fourth stage is a stage in which the vehicle control unit starts the filling control when the conditions for stopping the engine are satisfied. The fifth stage is a stage in which, after completion of the boosting of the oil pressure in the second oil passage by the filling control, the vehicle control unit switches the switch valve to the second state to start the torque replacement control and the clutch disengagement control. The sixth stage is a stage in which the vehicle control unit stops the engine after completion of the torque replacement control.

When the temperature of hydraulic oil in the clutch is low and the viscosity thereof is high, the oil pressure in the second oil passage is boosted slowly in the filling control. Moreover, the smaller the shaft torque of the engine at the time the torque replacement control is started is, the shorter the time it takes from the start to completion of the torque replacement control is. Accordingly, the vehicle control unit may be configured to perform the filling determination process based on the temperature of hydraulic oil in the clutch or based on the shaft torque of the engine at the time the conditions for stopping the engine are satisfied.

The vehicle control unit in the hybrid vehicle may be configured to perform a stop prediction process in which the vehicle control unit determines whether the conditions for stopping the engine are currently not satisfied but are likely to be satisfied later. In this case, the vehicle control unit may be configured to switch the drive mode from the engine drive mode to the EV drive mode through seventh, eighth, and ninth stages when the vehicle control unit determines in the stop prediction process that the conditions for stopping the engine are likely to be satisfied later. The seventh stage is a stage in which the vehicle control unit starts the filling control when it determines that the conditions for stopping the engine are likely to be satisfied later. The eighth stage is a stage in which, when the conditions for stopping the engine are satisfied, the vehicle control unit switches the switch valve to the second state to terminate the filling control and starts the torque replacement control and the clutch disengagement control. The ninth stage is a stage in which the vehicle control unit stops the engine after completion of the torque replacement control. In this case, if it is predicted that the conditions for stopping the engine would be satisfied, the oil pressure in the second oil passage can be boosted in advance before the conditions for stopping the engine are satisfied. Accordingly, both the torque replacement control and the clutch disengagement control can be started as soon as the conditions for stopping the engine are satisfied, without causing a decrease in clutch oil pressure.

The vehicle control unit in the above hybrid vehicle may be configured to perform start control when predetermined conditions for starting the engine are satisfied during the EV drive mode. The start control is control in which the vehicle control unit starts the engine with the switch valve being in the second state and with electric power being supplied to the pressure regulating valve. In this case, an oil pressure is supplied from the pressure regulating valve to the second oil passage during the start control. Accordingly, the vehicle control unit may be configured so that, when the conditions for stopping the engine are satisfied during the start control, the vehicle control unit does not perform the filling control but performs the clutch disengagement control as soon as the conditions for stopping the engine are satisfied.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

Figure 1:
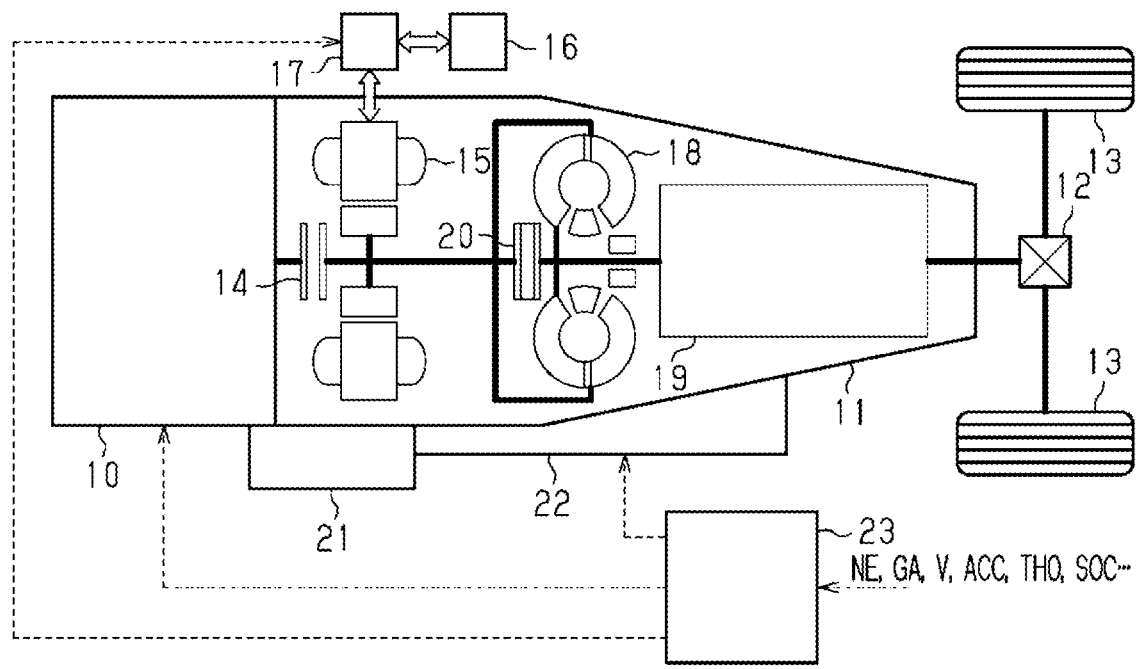
FIG. 1 is a schematic diagram showing the configuration of a drive system of an embodiment of a hybrid vehicle.

An embodiment of a hybrid vehicle will be described in detail with reference to FIGS. 1 to 10. First, the configuration of a drive system of the hybrid vehicle of the present embodiment will be described with reference to FIG. 1. As shown in FIG. 1, a shifting unit 11 is disposed in a power transmission path from an engine 10 to wheels 13 in the hybrid vehicle. The shifting unit 11 and the right and left wheels 13 are drivingly coupled via a differential 12.

The shifting unit 11 includes a clutch 14 and a motor 15. In the shifting unit 11, the motor 15 is disposed in the power transmission path from the engine 10 to the wheels 13. The clutch 14 is disposed in a part of the power transmission path which is located between the engine 10 and the motor 15. The clutch 14 is engaged when an oil pressure is supplied thereto. When engaged, the clutch 14 transmits power between the engine 10 and the motor 15. The clutch 14 is disengaged when supply of the oil pressure to the clutch 14 is stopped. When disengaged, the clutch 14 cuts off power transmission between the engine 10 and the motor 15.

The motor 15 is connected to an on-board power supply 16 via an inverter 17. The motor 15 functions as an electric motor that generates a driving force for the vehicle when electric power is supplied from the on-board power supply 16 to the motor 15. The motor 15 also functions as an electric generator that generates electric power to charge the on-board power supply 16 when power is transmitted from the engine 10 or the wheels 13 to the motor 15. The inverter 17 adjusts electric power that is transferred between the motor 15 and the on-board power supply 16.

The shifting unit 11 further includes a torque converter 18 and a gear type multi-stage transmission 19. The torque converter 18 is a fluid coupling having a torque amplifying function, and the gear type multi-stage transmission 19 switches the gear ratio in multiple stages by switching the gear stage. In the shifting unit 11, the gear type multi-stage transmission 19 is disposed in a part of the power transmission path which is located closer to the wheels 13 than the motor 15 is. The motor 15 and the gear type multi-stage transmission 19 are coupled via the torque converter 18. The torque converter 18 includes a lockup clutch 20. The lockup clutch 20 is engaged when an oil pressure is supplied thereto. When engaged, the lockup clutch 20 directly couples the motor 15 and the gear type multi-stage transmission 19.

The shifting unit 11 further includes an oil pump 21 and a hydraulic control unit 22. An oil pressure generated by the oil pump 21 is supplied via the hydraulic control unit 22 to the clutch 14, the torque converter 18, the gear type multi-stage transmission 19, and the lockup clutch 20. The hydraulic control unit 22 includes hydraulic circuits for the clutch 14, the torque converter 18, the gear type multi-stage transmission 19, and the lockup clutch 20, and various hydraulic control valves for controlling hydraulic oil pressures for the hydraulic circuits.

The hybrid vehicle includes a vehicle control unit 23. The vehicle control unit 23 is configured as an electronic control unit including an arithmetic processing circuit for performing various calculations associated with drive control of the vehicle and a storage device having control programs and control data stored therein. The vehicle control unit 23 receives detection signals such as the rotational speed of the engine 10 (engine speed NE), the intake air amount GA of the engine 10, the traveling speed V of the vehicle, the depression amount ACC of an accelerator pedal, the temperature of hydraulic oil in the shifting unit 11 (oil temperature THO), and the state of charge SOC of the on-board power supply 16. The vehicle control unit 23 performs drive control of the vehicle based on these detection signals. The drive control of the vehicle herein includes control of the operating state of the engine 10 (the intake air amount and the fuel injection amount) and control of power running/regenerative torque of the motor 15 through adjustment of the amount of electric power transfer to and from the on-board power supply 16 by the inverter 17. This drive control further includes operation control of the clutch 14, the torque converter 18, the gear type multi-stage transmission 19, and the lockup clutch 20 through drive control of each hydraulic control valve in the hydraulic control unit 22.

Figure 2:
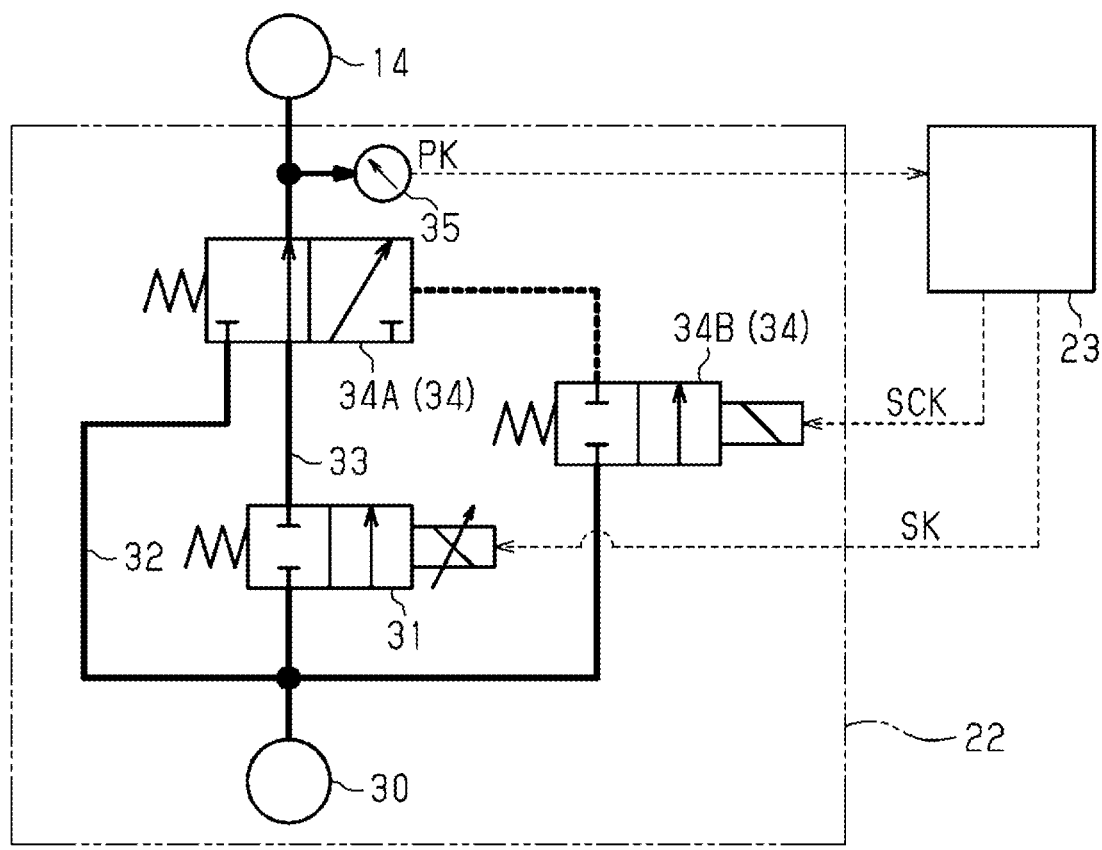
FIG. 2 is a diagram showing the configuration of a hydraulic circuit for a clutch in the hybrid vehicle.

FIG. 2 shows the configuration of the hydraulic circuit for the clutch 14 in the hydraulic control unit 22. An oil pressure generating unit 30 shown in the figure regulates oil fed from the oil pump 21 to a predetermined line pressure PL and outputs the line pressure PL. As shown in the figure, the hydraulic circuit for the clutch 14 includes a pressure regulating valve 31. The pressure regulating valve 31 is a linear solenoid valve that regulates the line pressure PL according to the amount of electric power supplied thereto and outputs the resultant oil pressure. The pressure regulating valve 31 is configured to stop outputting the oil pressure when supply of electric power thereto is stopped. An oil pressure supply path for the clutch 14 includes two oil passages, namely a first oil passage 32 and a second oil passage 33. The first oil passage 32 is an oil passage that directly supplies the line pressure PL generated by the oil pressure generating unit 30 to the clutch 14. The second oil passage 33 is an oil passage that supplies the oil pressure output from the pressure regulating valve 31 to the clutch 14.

The hydraulic circuit for the clutch 14 further includes a switch valve 34 that switches the oil passage to be connected to the clutch 14 between the first oil passage 32 and the second oil passage 33. The switch valve 34 is configured as a pilot solenoid valve having an oil passage switching unit 34A and a solenoid unit 34B. The solenoid unit 34B supplies the line pressure PL to the oil passage switching unit 34A when electric power is supplied thereto. The solenoid unit 34B stops supplying the line pressure PL to the oil passage switching unit 34A when supply of electric power thereto is stopped. When the line pressure PL is supplied from the solenoid unit 34B to the oil passage switching unit 34A, the oil passage switching unit 34A connects the first oil passage 32 to the clutch 14 and disconnects the second oil passage 33 from the clutch 14 (hereinafter this state is referred to as the first state). When supply of the line pressure PL from the solenoid unit 34B to the oil passage switching unit 34A is stopped, the oil passage switching unit 34A connects the second oil passage 33 to the clutch 14 and disconnects the first oil passage 32 from the clutch 14 (hereinafter this state is referred to as the second state). The hydraulic circuit for the clutch 14 includes an oil pressure sensor 35 for detecting an oil pressure that is supplied from the oil passage switching unit 34A to the clutch 14.

The vehicle control unit 23 outputs a switch valve drive signal SCK to the solenoid unit 34B of the switch valve 34. The switch valve drive signal SCK being on corresponds to the state in which electric power is being supplied to the solenoid unit 34B. The switch valve drive signal SCK being off corresponds to the state in which supply of electric power to the solenoid unit 34B is stopped. The vehicle control unit 23 also controls the amount of electric power SK to be supplied to the pressure regulating valve 31, so that the oil pressure that is output from the pressure regulating valve 31 to the second oil passage 33 can be changed in the range of 0 to the line pressure PL. Specifically, the vehicle control unit 23 sets the value of a pressure regulating valve command pressure PSK within the range of 0 to the line pressure PL. The vehicle control unit 23 calculates such an amount of electric power SK that causes the pressure regulating valve 31 to output an oil pressure corresponding to the pressure regulating valve command pressure PSK, and supplies the calculated amount of electric power SK to the pressure regulating valve 31. When the pressure regulating valve command pressure PSK is 0, namely when output of the oil pressure from the pressure regulating valve 31 is to be stopped, the vehicle control unit 23 sets the amount of electric power SK to 0, namely stops supplying electric power to the pressure regulating valve 31. The vehicle control unit 23 controls the amount of electric power SK so that the higher the pressure regulating valve command pressure PSK is, the larger the amount of electric power SK is.

In the hybrid vehicle configured as described above, the vehicle control unit 23 performs the drive control of the vehicle by selecting one of a plurality of drive modes including an EV drive mode and an engine drive mode. The EV drive mode is a drive mode in which the vehicle runs with the power of the motor 15 with the engine 10 being stopped, and the engine drive mode is a drive mode in which the vehicle runs by transmitting the power of the engine 10 to the wheels 13. How the vehicle control unit 23 performs control associated with switching of the drive mode between the engine drive mode and the EV drive mode will now be described in detail.

Figure 3:
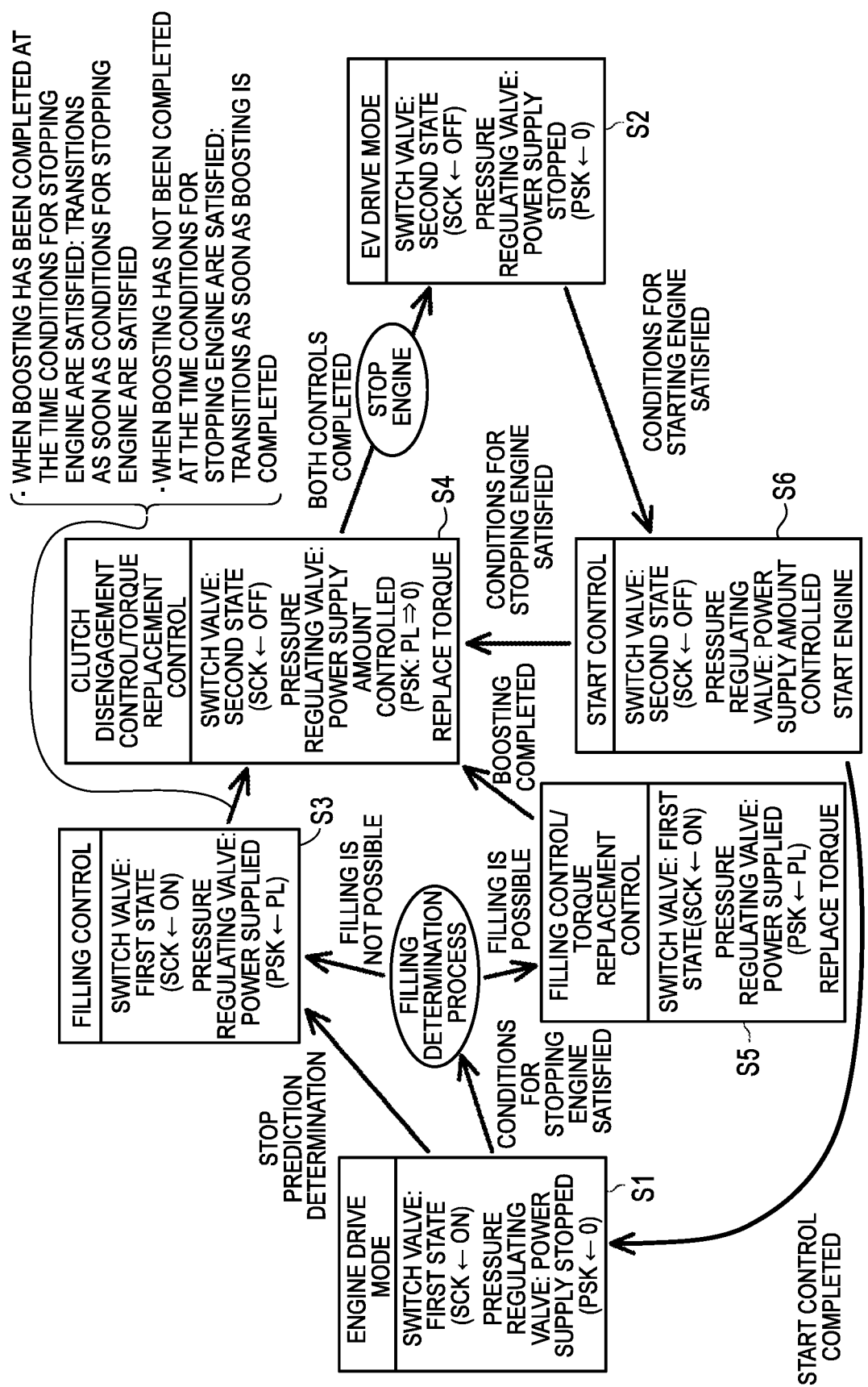
FIG. 3 is a state transition diagram illustrating control associated with switching of the drive mode, which is performed by a vehicle control unit.
Figure 4:
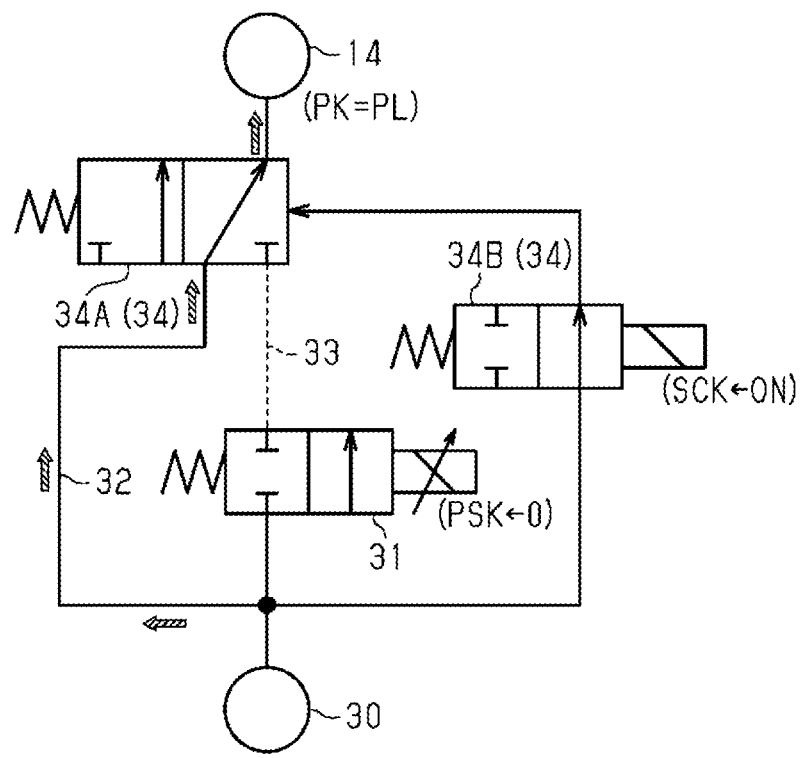
FIG. 4 is a diagram showing the state of the hydraulic circuit for the clutch during an engine drive mode.

FIG. 3 illustrates transitions of the control state of the vehicle control unit 23 associated with switching of the drive mode between the engine drive mode and the EV drive mode. As shown in the figure, the vehicle control unit 23 is in a control state S1 during the engine drive mode. In the control state S1, the switch valve drive signal SCK is on (ON) and the pressure regulating valve command pressure PSK is 0. As shown in FIG. 4, in this state, the clutch 14 is connected to the first oil passage 32. Namely, the line pressure PL is supplied to the clutch 14, and the clutch 14 is engaged. Since supply of electric power to the pressure regulating valve 31 is stopped, the pressure regulating valve 31 stops outputting an oil pressure to the second oil passage 33.

Figure 5:
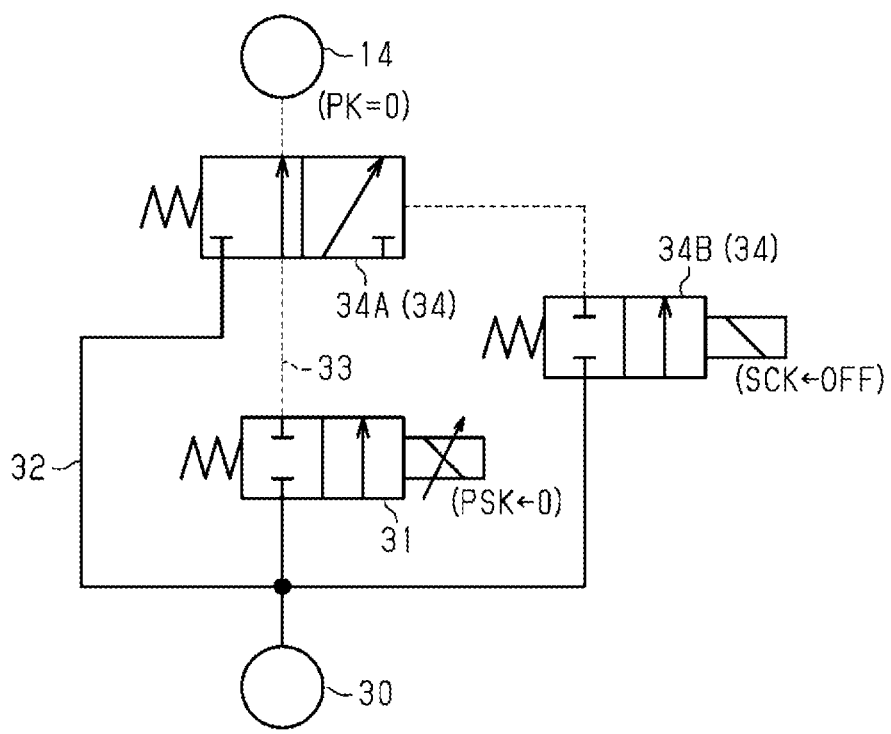
FIG. 5 is a diagram showing the state of the hydraulic circuit for the clutch during an EV drive mode.

The vehicle control unit 23 is in a control state S2 during the EV drive mode. In the control state S2, the switch valve drive signal SCK is off (OFF) and the pressure regulating valve command pressure PSK is 0. As shown in FIG. 5, in this state, the clutch 14 is connected to the second oil passage 33. Since supply of electric power to the pressure regulating valve 31 is stopped, the pressure regulating valve 31 stops outputting an oil pressure to the second oil passage 33. Accordingly, supply of the oil pressure to the clutch 14 is stopped, and the clutch 14 is disengaged.

The vehicle control unit 23 switches the drive mode to the EV drive mode when predetermined conditions for stopping the engine 10 are satisfied during the engine drive mode. The vehicle control unit 23 switches the drive mode to the engine drive mode when predetermined conditions for starting the engine 10 are satisfied during the EV drive mode. Whether the conditions for stopping the engine 10 or the conditions for starting the engine 10 have been satisfied is determined based on the required driving force for the vehicle, the state of charge SOC of the on-board power supply 16, etc. For example, the conditions for stopping the engine 10 are satisfied in the case where the state in which the required driving force is small enough that the motor 15 alone can generate power corresponding to the required driving force has continued for a certain period of time and the state of charge SOC is high enough that the engine 10 need not be operated to cause the motor 15 to generate electric power. The conditions for starting the engine 10 are satisfied in the case where the required driving force is large enough that the motor 15 alone cannot generate power corresponding to the required driving force or in the case where the state of charge SOC has become low enough that the motor 15 needs to generate electric power with the power of the engine 10. The required driving force is obtained from the depression amount ACC of the accelerator pedal, the traveling speed V of the vehicle, the gear speed of the gear type multi-stage transmission 19, etc.

Next, how the vehicle control unit 23 performs control associated with switching of the drive mode from the engine drive mode to the EV drive mode will be described. In the hybrid vehicle of the present embodiment, when the vehicle control unit 23 is in the control state S1 for the engine drive mode, the vehicle control unit 23 repeatedly performs a stop prediction process for the engine 10 at predetermined control intervals. In the stop prediction process, the vehicle control unit 23 determines whether the conditions for stopping the engine 10 are currently not satisfied but are likely to be satisfied later. In the following description, the determination in the stop prediction process that the conditions for stopping the engine 10 are likely to be satisfied later is sometimes referred to as the stop prediction determination. The vehicle control unit 23 determines whether the conditions for stopping the engine 10 are likely to be satisfied later, based on the depression amount ACC of the accelerator pedal, the traveling speed V of the vehicle, position information of the vehicle obtained from a car navigation system, etc. For example, in any of the following situations, the vehicle control unit 23 determines that the conditions for stopping the engine 10 are likely to be satisfied later.

When the depression amount ACC of the accelerator pedal has been reduced from a value larger than a certain value to the certain value or less.

When the traveling speed V of the vehicle is a certain value or higher.

When the required driving force has decreased from a value larger than a certain value to the certain value or less.

When the vehicle is moving downhill.

When the distance to a vehicle ahead has decreased to a certain value or less.

When the vehicle is approaching a curve.

When the lockup clutch 20 is in an engaged state.

Control associated with switching of the drive mode from the engine drive mode to the EV drive mode will be described. It is herein assumed that the conditions for stopping the engine 10 are satisfied after the vehicle control unit 23 determines in the stop prediction process that the conditions for stopping the engine 10 are likely to be satisfied later.

When the vehicle control unit 23 determines during the engine drive mode that the conditions for stopping the engine 10 are currently not satisfied but are likely to be satisfied later, the vehicle control unit 23 transitions to a control state S3 for filling control. In the control state S3, the vehicle control unit 23 performs filling control in which the switch valve drive signal SCK is on to keep the switch valve 34 in the first state and electric power is supplied to the pressure regulating valve 31 to boost an oil pressure P2 in the second oil passage 33. At this time, the vehicle control unit 23 sets the pressure regulating valve command pressure PSK to the line pressure PL to supply electric power to the pressure regulating valve 31. When the vehicle control unit 23 in the control state S3 determines that the conditions for stopping the engine 10 are not likely to be satisfied later, the vehicle control unit 23 sets the pressure regulating valve command pressure PSK to 0 to stop supplying electric power to the pressure regulating valve 31, and returns to the control state S1 for the engine drive mode.

When the conditions for stopping the engine 10 are satisfied while the vehicle control unit 23 is in the control state S3, the vehicle control unit 23 transitions to a control state S4 at the timing described below. When boosting of the oil pressure P2 in the second oil passage 33 by the filling control has been completed at the time the conditions for stopping the engine 10 are satisfied, the vehicle control unit 23 transitions to the control state S4 immediately. However, when boosting of the oil pressure P2 in the second oil passage 33 by the filling control has not been completed at the time the conditions for stopping the engine 10 are satisfied, the vehicle control unit 23 transitions to the control state S4 as soon as the boosting is completed. In the present embodiment, the vehicle control unit 23 determines that boosting of the oil pressure P2 in the second oil passage 33 by the filling control has been completed, when the time elapsed since the start of the filling control becomes equal to or longer than time T required for boosting. The time T required for boosting is set as time required to boost the oil pressure P2 in the second oil passage 33 to the line pressure PL by the filling control. The lower the oil temperature THO is, the higher the viscosity of hydraulic oil in the shifting unit 11 is. Accordingly, the lower the oil temperature THO is, the longer the time required to boost the oil pressure P2 in the second oil passage 33 to the line pressure PL by the filling control is. In the present embodiment, the set value of the time T required for boosting can be changed according to the oil temperature THO. Namely, the time T is set to a greater value when the oil temperature THO is low than when the oil temperature THO is high.

When the vehicle control unit 23 transitions from the control state S3 to the control state S4, the vehicle control unit 23 turns off the switch valve drive signal SCK to switch the switch valve 34 to the second state. Namely, the vehicle control unit 23 connects the second oil passage 33 to the clutch 14 and terminates the filling control. The vehicle control unit 23 starts clutch disengagement control and torque replacement control as soon as it transitions to the control state S4. In the torque replacement control, the vehicle control unit 23 gradually reduces shaft torque of the engine 10 and gradually increases torque that is generated by the motor 15 (hereinafter referred to as the motor torque) accordingly, and the vehicle control unit 23 thus reduces the shaft torque of the engine 10 eventually to 0 while maintaining transmission of power corresponding to the required driving force to the wheels 13. As the shaft torque of the engine 10 decreases, the engaging force of the clutch 14 which is required to transmit torque corresponding to the shaft torque from the engine 10 to the motor 15 decreases accordingly. In the clutch disengagement control, the vehicle control unit 23 reduces the pressure regulating valve command pressure PSK from the line pressure PL to 0 with reduction in shaft torque of the engine 10 in the torque replacement control within such a range that the clutch 14 has an engaging force large enough to transmit torque corresponding to the shaft torque. After the shaft torque of the engine 10 becomes equal to 0 and the pressure regulating valve command pressure PSK becomes equal to 0, namely after the clutch disengagement control and the torque replacement control are completed, the vehicle control unit 23 stops the engine 10 and transitions to the control state S2 for the EV drive mode.

When the conditions for stopping the engine 10 are not satisfied anymore during the clutch disengagement control and the torque replacement control, the vehicle control unit 23 returns to the control state S1 for the engine drive mode by increasing the pressure regulating valve command pressure PSK to the line pressure PL and then switching the switch valve 34 to the first state and stopping supply of electric power to the pressure regulating valve 31.

On the other hand, when the conditions for stopping the engine 10 are satisfied during the engine drive mode although the vehicle control unit 23 has determined that the conditions for stopping the engine 10 are not likely to be satisfied later, the vehicle control unit 23 performs a filling determination process. In the filling determination process, the vehicle control unit 23 determines whether boosting of the oil pressure P2 in the second oil passage 33 by the filling control can be completed within the period from the start to completion of the torque replacement control. In the following description, the expression "filling is possible" means that boosting of the oil pressure P2 in the second oil passage 33 by the filling control can be completed within the period from the start to completion of the torque replacement control, and the expression "filling is not possible" means that the boosting cannot be completed within this period.

In the torque replacement control in which the shaft torque of the engine 10 is gradually reduced to 0, the larger the shaft torque of the engine 10 at the start of the torque replacement control is, the longer it takes to complete the torque replacement control. When the temperature of hydraulic oil in the shifting unit 11 is low and the viscosity thereof is high, the oil pressure P2 in the second oil passage 33 increases slowly in the filling control. In the present embodiment, the vehicle control unit 23 therefore performs the filling determination process based on the shaft torque of the engine 10 and the oil temperature THO. Specifically, the vehicle control unit 23 sets a determination value based on the oil temperature THO. The vehicle control unit 23 sets the determination value to a greater value when the oil temperature THO is low than when the oil temperature THO is high. In the filling determination process, the vehicle control unit 23 determines that filling is possible when the shaft torque of the engine 10 at the time the conditions for stopping the engine 10 are satisfied is equal to or larger than the determination value, and determines that filling is not possible when this shaft torque is smaller than the determination value.

When the vehicle control unit 23 determines in the filling determination process that filling is not possible, the vehicle control unit 23 transitions to the control state S3 to perform the filling control. In this case, the conditions for stopping the engine 10 have already been satisfied at the time the vehicle control unit 23 transitions to the control state S3. Accordingly, the vehicle control unit 23 transitions to the control state S4 when boosting of the oil pressure P2 in the second oil passage 33 by the filling control is completed. After the torque replacement control and the clutch disengagement control are completed in the control state S4, the vehicle control unit 23 stops the engine 10 and transitions to the control state S2 for the EV drive mode.

On the other hand, when the vehicle control unit 23 determines in the filling determination process that filling is possible, the vehicle control unit 23 transitions to a control state S5. The vehicle control unit 23 starts the filling control and the torque control as soon as the vehicle control unit 23 transitions to the control state S5. The vehicle control unit 23 performs the filling control while reducing the pressure regulating valve command pressure PSK from the line pressure PL to 0 with reduction in shaft torque of the engine 10 in the torque replacement control within such a range that the clutch 14 has an engaging force large enough to transmit torque corresponding to the shaft torque.

Thereafter, when the vehicle control unit 23 determines that the time T required for boosting has passed since the start of the filling control and the torque replacement control and that boosting of the oil pressure P2 in the second oil passage 33 by the filling control has been completed, the vehicle control unit 23 switches the switch valve 34 to the second state (SCK=OFF) to terminate the filling control, and transitions to the control state S4. In the control state S4, the vehicle control unit 23 starts the clutch disengagement control while continuing the torque replacement control. In this case as well, the vehicle control unit 23 stops the engine 10 after these controls are completed, and transitions to the control state S2 for the EV drive mode.

Next, how the vehicle control unit 23 performs control associated with switching from the EV drive mode to the engine drive mode will be described. As described above, in the control state S2 for the EV drive mode, supply of electric power to the pressure regulating valve 31 is stopped and the clutch 14 is connected to the second oil passage 33. When the conditions for starting the engine 10 are satisfied during the EV drive mode, the vehicle control unit 23 transitions to a control state S6 for start control. In the control state S6, the vehicle control unit 23 controls a clutch oil pressure PK by the pressure regulating valve 31 in order to engage the clutch 14, while keeping the switch valve 34 in the second state. The vehicle control unit 23 controls the amount of electric power SK to be supplied to the pressure regulating valve 31 so that the clutch 14 generates an engaging force large enough to transmit power required to start the engine 10 from the motor 15 to the engine 10, while transmitting power corresponding to the required driving force from the motor 15 to the wheels 13. At this time, the vehicle control unit 23 performs torque control for the motor 15 so that required amounts of power are transmitted to the engine 10 and the wheels 13. After starting of the engine 10 is completed, the vehicle control unit 23 increases the pressure regulating valve command pressure PSK to the line pressure PL and switches the switch valve 34 to the first state. The vehicle control unit 23 then stops supplying electric power to the pressure regulating valve 31 and transitions to the control state S1 for the engine drive mode. When the conditions for stopping the engine 10 are satisfied during the start control, the vehicle control unit 23 transitions to the control state S4 to perform the clutch disengagement control and the torque replacement control, and then stops the engine 10 and returns to the control state S2 for the EV drive mode.

Functions and effects of the above embodiment will be described. In the hybrid vehicle of the present embodiment, in the clutch disengagement control and the start control which are performed during transition between the engine drive mode and the EV drive mode, the clutch 14 is switched between the disengaged and engaged states while controlling the oil pressure to be supplied to the clutch 14 (hereinafter referred to as the clutch oil pressure PK) by the pressure regulating valve 31. The clutch 14 is thus smoothly disengaged and engaged while restraining revving up or down of the engine 10 and occurrence of torque shock. In the engine drive mode, supply of electric power to the pressure regulating valve 31 is stopped and the switch valve 34 is in the first state, whereby the line pressure PL is supplied to the clutch 14 and the clutch 14 is kept in the engaged state. In the EV drive mode, supply of electric power to the pressure regulating valve 31 is stopped and the switch valve 34 is in the second state, whereby supply of an oil pressure to the clutch 14 is stopped and the clutch 14 is kept in the disengaged state.

Similar hydraulic control for the clutch 14 can be performed by configuring the hydraulic circuit so that the first oil passage 32 and the switch valve 34 are omitted and the second oil passage 33 is directly connected to the clutch 14. In this case, the clutch 14 is kept in the engaged state by continuing to supply electric power to the pressure regulating valve 31 so that the pressure regulating valve 31 outputs an oil pressure corresponding to the line pressure PL. Control accuracy for the clutch oil pressure cannot be ensured unless sensitivity of the output oil pressure of the pressure regulating valve 31 to the amount of electric power SK that is supplied to the pressure regulating valve 31 is low. A relatively large amount of electric power therefore needs to be supplied to the pressure regulating valve 31 in order to keep its output oil pressure at the line pressure PL. Accordingly, power consumption may be too much when such a relatively large amount of electric power continues to be supplied to the pressure regulating valve 31 during the engine drive mode.

In the hybrid vehicle of the present embodiment, on the other hand, the clutch oil pressure is controlled by the pressure regulating valve 31 during transition of the drive mode, but supply of electric power to the pressure regulating valve 31 with large power consumption can be stopped during the period other than during transition of the drive mode. In this case as well, in order to keep the clutch 14 in the engaged state during the engine drive mode, supply of electric power to the solenoid unit 34B of the switch valve 34 needs to be maintained so as to keep the switch valve 34 in the first state. However, the switch valve 34 merely switches between the two states, namely the first state in which the switch valve 34 connects the first oil passage 32 to the clutch 14 and the state in which the switch valve 34 connects the second oil passage 33 to the clutch 14, according to whether electric power is supplied to the switch valve 34 or not. The amount of electric power that needs to be supplied to the switch valve 34 to keep the switch valve 34 in the first state is therefore significantly smaller than that of electric power that needs to be supplied to the pressure regulating valve 31 in order to keep the output of the pressure regulating valve 31 at the line pressure PL. Accordingly, power consumption is limited in this case.

In the hybrid vehicle of the present embodiment, in the control state S1 for the engine drive mode, supply of electric power to the pressure regulating valve 31 is stopped and the switch valve 34 is in the first state, whereby the line pressure PL is supplied to the clutch 14 and the clutch 14 is kept in the engaged state. In the control state S2 for the EV drive mode, supply of electric power to the pressure regulating valve 31 is stopped and the switch valve 34 is in the second state, whereby supply of an oil pressure to the clutch 14 is stopped and the clutch 14 is kept in the disengaged state. When the drive mode is switched from the engine drive mode to the EV drive mode, the clutch 14 is disengaged while performing control of the clutch oil pressure PK by the pressure regulating valve 31 with the second oil passage 33 being connected to the clutch 14.

If the time required to switch the drive mode from the engine drive mode to the EV drive mode increases and stopping of the engine 10 is delayed, fuel consumption increases as fuel is consumed by the engine 10 during the delay. It is therefore desirable to switch the drive mode in a short time. However, the following situation occurs if the clutch disengagement control is started without any preparation as soon as the conditions for stopping the engine 10 are satisfied in order to reduce the time required to switch the drive mode.

Figure 6:
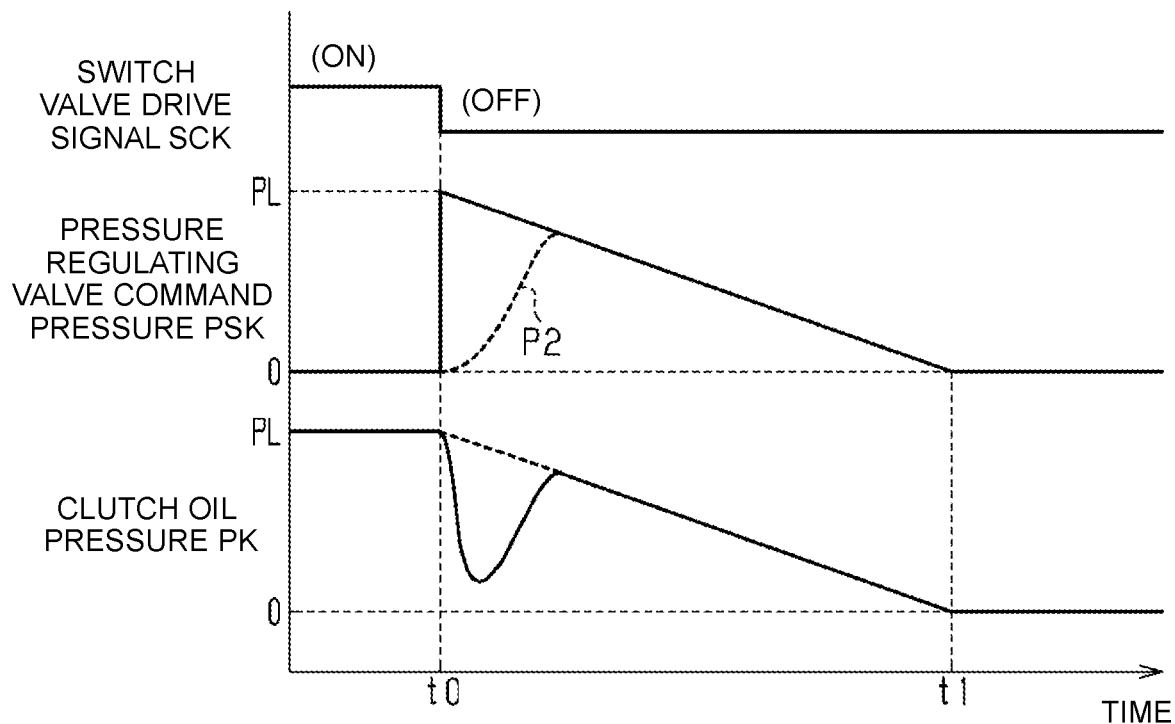
FIG. 6 is a timing chart illustrating how control associated with switching of the drive mode is performed in the case where supply of electric power to a pressure regulating valve is started simultaneously with switching of a switch valve to a second state to perform clutch disengagement control.

FIG. 6 shows how the switch valve drive signal SCK, the pressure regulating valve command pressure PSK, and the clutch oil pressure PK change in the case where the clutch disengagement control is performed as soon as the conditions for stopping the engine 10 are satisfied, as described above. In the figure, the vehicle control unit 23 transitions from the control state S1 for the engine drive mode to the control state S4 at time t0. That is, at time t0, the switch valve drive signal SCK is turned off and the switch valve 34 is switched from the first state to the second state. At the same time, the pressure regulating valve command pressure PSK is switched from 0 to the line pressure PL to start supplying electric power to the pressure regulating valve 31. The pressure regulating valve command pressure PSK is gradually reduced from the line pressure PL to 0 during the period from time t0 to time t1. The clutch engagement control is performed in this manner.

In the control state S1 for the engine drive mode, the switch valve 34 is in the first state, and the line pressure PL is supplied to the clutch 14 through the first oil passage 32. In the control state S1, however, supply of electric power to the pressure regulating valve 31 is stopped and therefore there is no oil pressure in the second oil passage 33 (see FIG. 4). Accordingly, even if supply of electric power to the pressure regulating valve 31 is started at time t0, it takes a certain amount of time for the oil pressure P2 in the second oil passage 33 to increase to a value corresponding to the pressure regulating valve command pressure PSK, as shown by dashed line in the figure. Therefore, if the second oil passage 33 is connected to the clutch 14 at time t0, the clutch oil pressure PK that has been kept at the line pressure PL abruptly decreases immediately. As a result, the engaging force of the clutch 14 decreases, and the load of the engine 10 decreases accordingly, which causes revving up of the engine 10. Moreover, since not all of the power of the engine 10 can be transmitted to the wheels 13 due to the decrease in engaging force, torque shock may occur.

In the present embodiment, on the other hand, the vehicle control unit 23 transitions from the control state S1 for the engine drive mode to the control state S4 after performing the filling control in the control state S3 or the control state S5. That is, the clutch disengagement control is started after the oil pressure P2 in the second oil passage 33 is boosted by the filling control.

Figure 7:
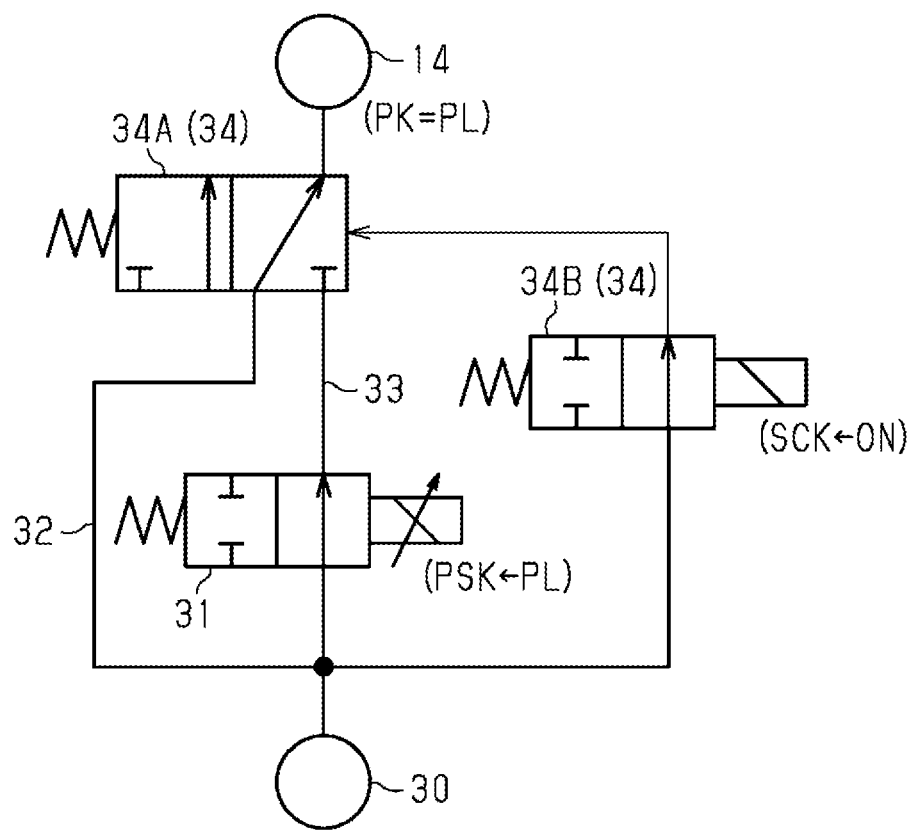
FIG. 7 is a diagram showing the state of the hydraulic circuit for the clutch during filling control.

FIG. 7 shows the state of the hydraulic circuit for the clutch 14 during the filling control. As shown in the figure, during the filling control, electric power is supplied to the pressure regulating valve 31 with the switch valve 34 being in the first state (SCK=ON) and thus the clutch 14 being connected to the first oil passage 32. Accordingly, when the filling control is started, the clutch oil pressure PK is kept at the line pressure PL, and an oil pressure is introduced from the pressure regulating valve 31 to the second oil passage 33 where there has been no oil pressure during the engine drive mode. In the present embodiment, the oil pressure P2 in the second oil passage 33 is boosted in advance by the filling control. This restrains the clutch oil pressure PK from decreasing when the second oil passage 33 is connected to the clutch 14 in order to control the clutch oil pressure PK by the pressure regulating valve 31 in the clutch disengagement control.

If the torque replacement control and the clutch disengagement control are started after the conditions for stopping the engine 10 are satisfied and boosting of the oil pressure P2 in the second oil passage 33 by the filling control is completed, the time required to complete switching of the drive mode to the EV drive mode increases by the time required to boost the oil pressure P2 by the filling control. Accordingly, in the present embodiment, the stop prediction process is performed during the engine drive mode to determine whether the conditions for stopping the engine 10 are currently not satisfied but are likely to be satisfied later. When it is determined before the conditions for stopping the engine 10 are satisfied that the conditions for stopping the engine 10 are likely to be satisfied later, namely when it is predicted that the conditions for stopping the engine 10 would be satisfied, the filling control is started immediately.

Figure 8:
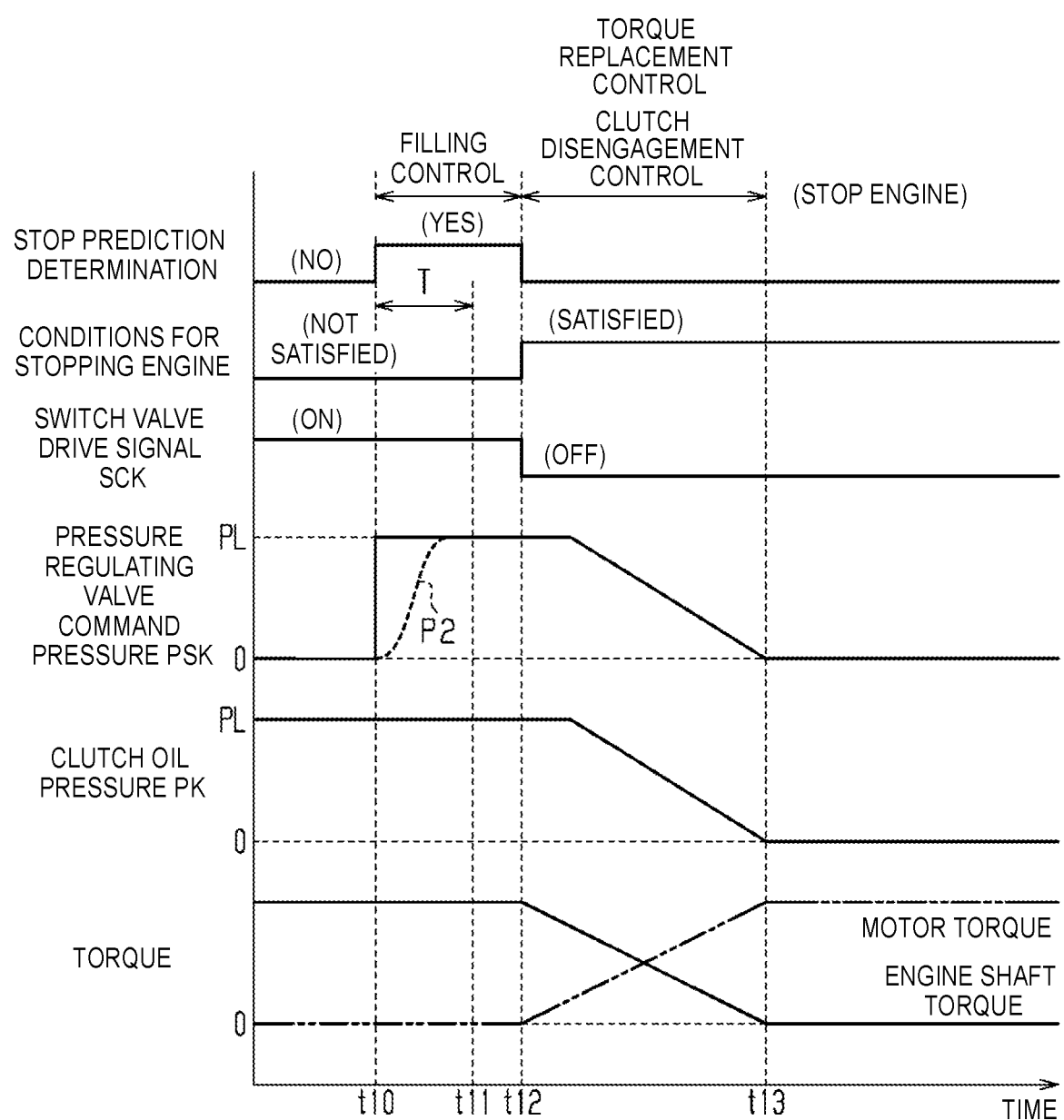
FIG. 8 is a timing chart illustrating how control associated with switching of the drive mode is performed in the hybrid vehicle of the embodiment in the case where conditions for stopping an engine are satisfied after it is determined that the conditions for stopping the engine are likely to be satisfied later.

FIG. 8 illustrates how control associated with switching of the drive mode is performed in the hybrid vehicle of the present embodiment in the case where the conditions for stopping the engine 10 are satisfied after it is determined that the conditions for stopping the engine 10 are likely to be satisfied later. The vehicle control unit 23 is in the control state S1 for the engine drive mode until time t10. That is, during this period, the pressure regulating valve command pressure PSK is 0 and the switch valve drive signal SCK is on, so that the line pressure PL is supplied to the clutch 14 through the first oil passage 32.

When it is determined at time t10 that the conditions for stopping the engine 10 are likely to be satisfied later, the filling control is started. Namely, the switch valve drive signal SCK is kept on and the pressure regulating valve command pressure PSK is changed from 0 to the line pressure PL. Supply of electric power to the pressure regulating valve 31 is thus started with the first oil passage 32 being kept connected to the clutch 14. Accordingly, the pressure regulating valve 31 starts supplying an oil pressure to the second oil passage 33 while the line pressure PL continues to be supplied to the clutch 14 through the first oil passage 32.

In FIG. 8, boosting of the oil pressure P2 in the second oil passage 33 to the line pressure PL by the filling control is completed at time t11, namely when the time T required for boosting has passed since time t10, and the conditions for stopping the engine 10 are satisfied at time t12 that is later than time t11. In this case, as soon as the conditions for stopping the engine 10 are satisfied, the vehicle control unit 23 switches the switch valve 34 to the second state and transitions to the control state S4. That is, the switch valve drive signal SCK is turned off at time t12, whereby the switch valve 34 is switched to the second state to connect the second oil passage 33 to the clutch 14. Since the oil pressure P2 in the second oil passage 33 has been boosted to the line pressure PL by the filling control, the clutch oil pressure PK is kept at the line pressure PL even when the oil passage that is connected to the clutch 14 is switched to the second oil passage 33.

The clutch disengagement control and the torque replacement control are then performed during the period from time t12 to time t13. After these controls are completed, the engine 10 is stopped, whereby the drive mode is switched to the EV drive mode.

In the case where the filling control is started after it is determined that the conditions for stopping the engine 10 are likely to be satisfied later, and the conditions for stopping the engine 10 are satisfied before boosting of the oil pressure P2 in the second oil passage 33 by the filling control is completed, the vehicle control unit 23 waits until the time T required for boosting passes after the start of the filling control, namely waits until boosting of the oil pressure P2 in the second oil passage 33 by the filling control is completed, and then transitions to the control state S4. Accordingly, even in this case, the clutch 14 will not be connected to the second oil passage 33 with the oil pressure P2 in the second oil passage 33 insufficiently boosted, and therefore the clutch oil pressure PK will not decrease.

In the present embodiment, when the conditions for stopping the engine 10 are satisfied although it has been determined that the conditions for stopping the engine 10 are not likely to be satisfied later, that is, when it is not predicted that the conditions for stopping the engine 10 would be satisfied, the filling determination process is performed. In the filling determination process, it is determined whether boosting of the oil pressure P2 in the second oil passage 33 by the filling control can be completed within the period from the start to completion of the torque replacement control.

Figure 9:
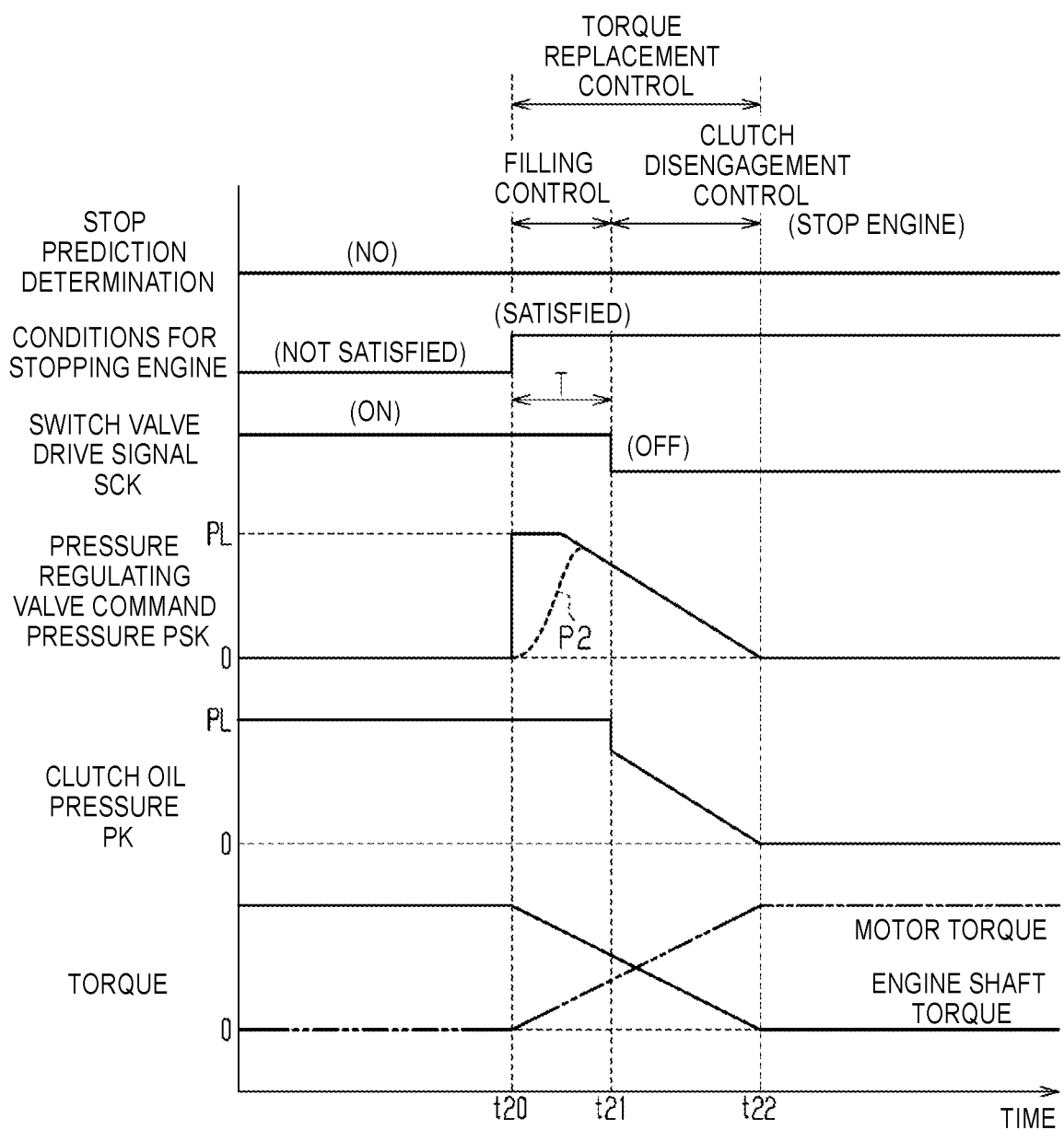
FIG. 9 is a timing chart illustrating how control associated with switching of the drive mode is performed in the hybrid vehicle of the embodiment in the case where the conditions for stopping the engine are satisfied before it is determined that the conditions for stopping the engine are likely to be satisfied later and boosting of an oil pressure in a second oil passage can be completed during torque replacement control.

FIG. 9 illustrates how control associated with switching of the drive mode is performed in the case where it is determined in the filling determination process that filling is possible. In the figure, the conditions for stopping the engine 10 are satisfied at time t20 although it has been determined that the conditions for stopping the engine 10 are not likely to be satisfied later. In this case, the switch valve drive signal SCK is kept on and the pressure regulating valve command pressure PSK is changed from 0 to the line pressure PL at time t20, namely at the time the conditions for stopping the engine 10 are satisfied. The filling control is thus started at time t20. The torque replacement control is also started at the same time.

At time t21, namely when the time T required for boosting has passed since time t20, the switch valve drive signal SCK is turned off and the second oil passage 33 is connected to the clutch 14, whereby the filling control is terminated. The clutch disengagement control is started while continuing the torque replacement control. The torque replacement control and the clutch disengagement control are performed until time t22. After completion of the torque replacement control and the clutch disengagement control, the engine 10 is stopped, whereby switching of the drive mode to the EV drive mode is completed.

During the filling control that is performed from time t20 to time t21, the clutch 14 is connected to the first oil passage 32 and the clutch oil pressure PK is kept at the line pressure PL. Moreover, during the filling control, the pressure regulating valve command pressure PSK is set to a value high enough that torque corresponding to the shaft torque of the engine 10 can be transmitted, and the filling control is continued for a period of time required to boost the oil pressure P2 in the second oil passage 33 to the line pressure PL (the time T required for boosting). Accordingly, the oil pressure P2 in the second oil passage 33 at time t21, namely at the time the second oil passage 33 is connected to the clutch 14, is equal to or higher than the oil pressure required to transmit the shaft torque of the engine 10 at that time. The drive mode is thus switched from the engine drive mode to the EV drive mode while applying to the clutch 14 the clutch oil pressure PK required to transmit the shaft torque of the engine 10.

Figure 10:
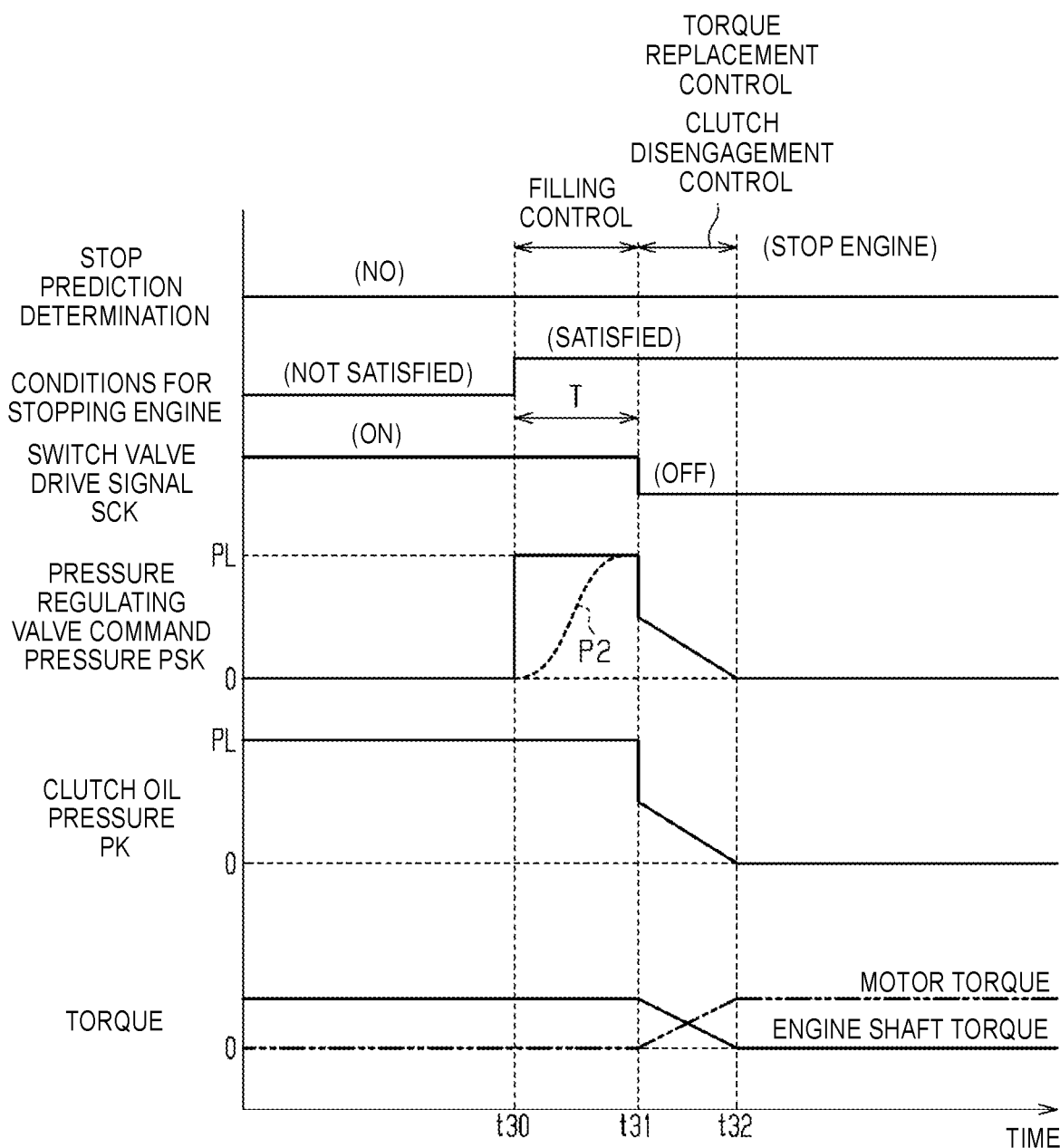
FIG. 10 is a timing chart illustrating how control associated with switching of the drive mode is performed in the hybrid vehicle of the embodiment in the case where the conditions for stopping the engine are satisfied before it is determined that the conditions for stopping the engine are likely to be satisfied later and boosting of the oil pressure in the second oil passage cannot be completed during the torque replacement control.

FIG. 10 illustrates how control associated with switching of the drive mode is performed in the case where the shaft torque of the engine 10 at the time the conditions for stopping the engine 10 are satisfied is small and it is determined in the filling determination process that filling is not possible. In the figure, the conditions for stopping the engine 10 are satisfied at time t30 although it has been determined that the conditions for stopping the engine 10 are not likely to be satisfied later. In this case, only the filling control is performed at time t30, namely at the time the conditions for stopping the engine 10 are satisfied. Boosting of the oil pressure P2 in the second oil passage 33 by the filling control is completed at time t31, namely when the time T required for boosting has passed since time t30, and the torque replacement control and the clutch disengagement control are started at time t31. After these controls are completed at time t32, the engine 10 is stopped, whereby the drive mode is switched to the EV drive mode. In this case, the shaft torque is reduced only by a small amount in the torque replacement control, and it therefore doesn't take so much time to complete the torque replacement control. Accordingly, even though the torque replacement control and the clutch disengagement control are started after completion of boosting of the oil pressure P2 in the second oil passage 33 by the filling control, it doesn't take so much time to complete switching of the drive mode to the EV drive mode.

During the start control for the engine 10 which is performed to switch the drive mode from the EV drive mode to the engine drive mode, the second oil passage 33 is connected to the clutch 14 and the clutch oil pressure PK is controlled by the pressure regulating valve 31, whereby an oil pressure is introduced into the second oil passage 33. Accordingly, in the present embodiment, when the conditions for stopping the engine 10 are satisfied during the start control, the filling control is not performed and the clutch disengagement control is performed as soon as the conditions for stopping the engine 10 are satisfied. The engine 10 can thus be quickly stopped.

The present embodiment can be modified as follows. The present embodiment and the following modifications can be combined unless technical inconsistency arises.

In the above embodiment, whether boosting of the oil pressure P2 in the second oil passage 33 by the filling control has been completed or not is determined based on the time elapsed since the start of the filling control. However, an oil pressure sensor may be disposed in the second oil passage 33, and whether boosting of the oil pressure P2 in the second oil passage 33 by the filling control has been completed or not may be determined based on the detection result of the oil pressure sensor.

In the above embodiment, the filling determination process is performed based on both the temperature of hydraulic oil in the shifting unit 11, namely the temperature of hydraulic oil in the clutch 14, and the shaft torque of the engine 10 at the time the conditions for stopping the engine 10 are satisfied. However, for example, the filling determination process may be performed in the following manner. The time required to boost the oil pressure P2 in the second oil passage 33 by the filling control is calculated based on the temperature of hydraulic oil in the clutch 14, and the time required to complete the torque replacement control is calculated based on the shaft torque of the engine 10 at the time the conditions for stopping the engine 10 are satisfied. When the time required to boost the oil pressure P2 in the second oil passage 33 by the filling control is longer than the time required to complete the torque replacement control, it is determined that filling is not possible.

The filling determination process may be performed based on only one of the temperature of hydraulic oil in the clutch 14 and the shaft torque of the engine 10. For example, in the filling determination process based only on the temperature of hydraulic oil in the clutch 14, it can be determined that filling is not possible when the temperature of hydraulic oil in the clutch 14 is lower than a certain value and it takes long to complete boosting of the oil pressure P2 in the second oil passage 33 by the filling control. In the filling determination process based only on the shaft torque of the engine 10, it can be determined that filling is not possible if the shaft torque of the engine 10 at the time the conditions for stopping the engine 10 are satisfied is smaller than a certain value and the time required to complete the torque replacement control is short.

The conditions for stopping the engine 10, the conditions for starting the engine 10, the conditions for determining that the conditions for stopping the engine 10 are likely to be satisfied later, and the details on the filling determination process may be changed as appropriate.

In the above embodiment, when the drive mode is switched from the EV drive mode to the engine drive mode, the clutch oil pressure PK is controlled by the pressure regulating valve 31 with the clutch 14 being connected to the second oil passage 33, whereby the engine 10 is started with the power of the motor 15. However, the engine 10 may be started in a different manner. For example, a separate motor for starting the engine 10 may be provided in the hybrid vehicle in addition to the motor 15, and the engine 10 may be started by the motor for starting the engine 10.

In the above embodiment, when the conditions for stopping the engine 10 are satisfied although it has been determined that the conditions for stopping the engine 10 are not likely to be satisfied later, the filling control is started when the conditions for stopping the engine 10 are satisfied, and the clutch disengagement control is started after completion of boosting of the oil pressure P2 in the second oil passage 33 by the filling control. In the case where the conditions for stopping the engine 10 will never be satisfied as long as it has been determined that the conditions for stopping the engine 10 are not likely to be satisfied later, control corresponding to the control state S3 in FIG. 3 may not be incorporated into the control logic of the vehicle control unit 23.

In the above embodiment, when the conditions for stopping the engine 10 are satisfied after it is determined that the conditions for stopping the engine 10 are likely to be satisfied later but before completion of boosting of the oil pressure P2 in the second oil passage 33 by the filling control, the start of the clutch disengagement control is delayed until the boosting of the oil pressure P2 is completed. Even in this case, the oil pressure P2 in the second oil passage 33 has been increased to some extent at the time the conditions for stopping the engine 10 are satisfied. Accordingly, even in this case, the second oil passage 33 may be connected to the clutch 14 and the clutch disengagement control may be started as soon as the conditions for stopping the engine 10 are satisfied. This also can restrain the clutch oil pressure PK from decreasing at the time control of the clutch oil pressure PK is started.

In the above embodiment, in the case where it is predicted by the stop prediction process that the conditions for stopping the engine 10 would be satisfied, the filling control is performed before the conditions for starting the engine 10 are satisfied. However, the stop prediction process may not be performed and the filling control may be performed after the conditions for stopping the engine 10 are satisfied.

In the case where the time required to complete the torque replacement control is always longer than the time required to boost the oil pressure P2 in the second oil passage 33 by the filling control, etc. the filling determination process may not be performed and the filling control and the torque replacement control may always be started as soon as the conditions for starting the engine 10 are satisfied.

In the above embodiment, a pilot solenoid valve is used as the switch valve 34. However, a direct acting solenoid valve may be used as the switch valve 34.

In the above embodiment, the switch valve 34 is configured to connect the first oil passage 32 to the clutch 14 when electric power is supplied to the switch valve 34 and to connect the second oil passage 33 to the clutch 14 when supply of electric power to the switch valve 34 is stopped. However, the switch valve 34 may be configured to connect the second oil passage 33 to the clutch 14 when electric power is supplied to the switch valve 34 and to connect the first oil passage 32 to the clutch 14 when supply of electric power to the switch valve 34 is stopped.

In the above embodiment, by performing the torque replacement control, power corresponding to the required driving force is maintained even during switching from the engine drive mode to the EV drive mode. However, in the case where power corresponding to the required driving force need not be maintained during switching from the engine drive mode to the EV drive mode, such as in the case where the drive mode is switched from the engine drive mode to the EV drive mode while the vehicle is stopped, the drive mode may be switched without performing the torque replacement control.

In the above embodiment, the oil pressure generating unit 30 generates the line pressure PL as a source pressure for hydraulic control of each hydraulic element of the shifting unit 11. However, in the case where an oil pressure required to keep the clutch 14 in the engaged state (clutch engagement oil pressure) is set to a value lower than the line pressure PL, the oil pressure generating unit 30 may be configured to step down the line pressure PL and output the resultant oil pressure.

What is claimed is:
1. A hybrid vehicle, comprising:
an engine mounted on a vehicle;
a motor disposed in a power transmission path from the engine to a wheel;
a clutch disposed in a part of the power transmission path, which is located between the engine and the motor;
an oil pressure generating unit that generates a clutch engagement oil pressure;
a pressure regulating valve that regulates the clutch engagement oil pressure in accordance with an amount of electric power supplied to the pressure regulating valve and outputs a resultant oil pressure, and that stops outputting oil pressure when supply of electric power to the pressure regulating valve is stopped;
a first oil passage that supplies the clutch engagement oil pressure generated by the oil pressure generating unit to the clutch;
a second oil passage that supplies the resultant oil pressure output from the pressure regulating valve to the clutch;
a switch valve that switches between a first state and a second state, the first state being a state in which the switch valve connects the first oil passage to the clutch and disconnects the second oil passage from the clutch, and the second state being a state in which the switch valve connects the second oil passage to the clutch and disconnects the first oil passage from the clutch; and
a vehicle control unit that selects one of a plurality of drive modes and performs drive control of the vehicle, the plurality of drive modes including an engine drive mode in which the vehicle runs by transmitting power of the engine to the wheel and an EV drive mode in which the vehicle runs with power of the motor with the engine being stopped, wherein:
the vehicle control unit is configured to switch the drive mode to the EV drive mode when predetermined conditions for stopping the engine are satisfied during the engine drive mode, to stop supplying electric power to the pressure regulating valve and switch the switch valve to the second state and thus keep the clutch in a disengaged state during the EV drive mode, and to stop supplying electric power to the pressure regulating valve and switch the switch valve to the first state and thus keep the clutch in an engaged state during the engine drive mode;
the vehicle control unit is configured to perform filling control, torque replacement control, and clutch disengagement control, the filling control being control in which the vehicle control unit supplies electric power to the pressure regulating valve with the switch valve being in the first state and thus boosts an oil pressure in the second oil passage, the torque replacement control being control in which the vehicle control unit increases motor torque while reducing shaft torque of the engine, and the clutch disengagement control being control in which the vehicle control unit disengages the clutch while performing hydraulic control by the pressure regulating valve with the switch valve being in the second state; and
the vehicle control unit is configured to switch the drive mode from the engine drive mode to the EV drive mode through first, second, and third stages, the first stage being a stage in which the vehicle control unit starts the filling control and the torque replacement control when the conditions for stopping the engine are satisfied, the second stage being a stage in which the vehicle control unit switches the switch valve to the second state during the torque replacement control to terminate the filling control and starts the clutch disengagement control, and the third stage being a stage in which the vehicle control unit stops the engine after completion of the torque replacement control and the clutch disengagement control.

2. The hybrid vehicle according to claim 1, wherein:

the vehicle control unit is configured to perform a filling determination process when the conditions for stopping the engine are satisfied, the filling determination process being a process in which the vehicle control unit determines whether boosting of the oil pressure in the second oil passage by the filling control can be completed within a period from start to completion of the torque replacement control; and the vehicle control unit is configured to switch the drive mode from the engine drive mode to the EV drive mode through fourth, fifth, and sixth stages when the vehicle control unit determines in the filling determination process that the boosting cannot be completed within the period, the fourth stage being a stage in which the vehicle control unit starts the filling control when the conditions for stopping the engine are satisfied, the fifth stage being a stage in which, after completion of the boosting of the oil pressure in the second oil passage by the filling control, the vehicle control unit switches the switch valve to the second state to start the torque replacement control and the clutch disengagement control, the sixth stage being a stage in which the vehicle control unit stops the engine after completion of the torque replacement control.

3. The hybrid vehicle according to claim 2, wherein the vehicle control unit is configured to perform the filling determination process based on a temperature of hydraulic oil in the clutch.

4. The hybrid vehicle according to claim 2, wherein the vehicle control unit is configured to perform the filling determination process based on the shaft torque of the engine at the time the conditions for stopping the engine are satisfied.

5. The hybrid vehicle according to claim 1, wherein the vehicle control unit is configured to perform a stop prediction process in which the vehicle control unit determines whether the conditions for stopping the engine are currently not satisfied but are likely to be satisfied later, and the vehicle control unit is configured to switch the drive mode from the engine drive mode to the EV drive mode through seventh, eighth, and ninth stages when the vehicle control unit determines in the stop prediction process that the conditions for stopping the engine are likely to be satisfied later, the seventh stage being a stage in which the vehicle control unit starts the filling control when it determines that the conditions for stopping the engine are likely to be satisfied later, the eighth stage being a stage in which, when the conditions for stopping the engine are satisfied, the vehicle control unit switches the switch valve to the second state to terminate the filling control and starts the torque replacement control and the clutch disengagement control, and the ninth stage being a stage in which the vehicle control unit stops the engine after completion of the torque replacement control.

6. The hybrid vehicle according to claim 1, wherein:

the vehicle control unit is configured to perform start control when predetermined conditions for starting the engine are satisfied during the EV drive mode, the start control being control in which the vehicle control unit starts the engine with the switch valve being in the second state and with electric power being supplied to the pressure regulating valve; and the vehicle control unit is configured so that, when the conditions for stopping the engine are satisfied during the start control, the vehicle control unit does not perform the filling control but performs the clutch disengagement control as soon as the conditions for stopping the engine are satisfied.

* * * * *